US008448761B2

(12) United States Patent
Shipman et al.

(10) Patent No.: US 8,448,761 B2
(45) Date of Patent: May 28, 2013

(54) VALVE MECHANISM FOR A GAS SUSPENSION SYSTEM

(75) Inventors: Christopher Shipman, Chicago, IL (US); John Cheever, Chicago, IL (US); Michael Nono, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 540 days.

(21) Appl. No.: 11/465,175

(22) Filed: Aug. 17, 2006

(65) Prior Publication Data

US 2007/0262501 A1    Nov. 15, 2007

Related U.S. Application Data

(63) Continuation of application No. 11/383,421, filed on May 15, 2006, now abandoned.

(51) Int. Cl.
*F16F 9/34*     (2006.01)

(52) U.S. Cl.
USPC ............... 188/322.15; 188/322.22; 267/64.16

(58) Field of Classification Search
USPC ................ 267/64.16, 64.17, 64.26, 226, 124, 267/64.11, 64.14, 64.15; 280/276, 279, 277, 280/280; 188/322.15, 322.22, 284, 322.16
See application file for complete search history.

(56) References Cited

U.S. PATENT DOCUMENTS

| 4,240,619 | A | * | 12/1980 | Wirges et al. | 267/64.11 |
| 4,971,344 | A | * | 11/1990 | Turner | 280/276 |
| 5,195,766 | A | * | 3/1993 | Dohrmann et al. | 280/276 |
| 5,634,653 | A | * | 6/1997 | Browning | 280/276 |
| 5,725,226 | A | * | 3/1998 | Cabrerizo-Pariente | 280/276 |
| 6,095,541 | A | * | 8/2000 | Turner et al. | 280/276 |
| 6,105,988 | A | * | 8/2000 | Turner et al. | 280/276 |
| 6,129,343 | A | * | 10/2000 | Ecarnot | 267/64.11 |
| 6,311,962 | B1 | * | 11/2001 | Marking | 267/64.25 |
| 6,505,719 | B2 | * | 1/2003 | Gonzalez et al. | 188/319.2 |
| 6,592,136 | B2 | * | 7/2003 | Becker et al. | 280/276 |
| 7,195,234 | B2 | * | 3/2007 | Jordan et al. | 267/64.11 |
| 2004/0262879 | A1 | * | 12/2004 | Kinzler et al. | 280/276 |
| 2005/0116399 | A1 | * | 6/2005 | Jordan et al. | 267/64.11 |

FOREIGN PATENT DOCUMENTS

| EP | 1079139 A1 | * | 2/2001 |
| EP | 1079139 A1 | * | 2/2001 |

* cited by examiner

*Primary Examiner* — Robert A Siconolfi
*Assistant Examiner* — James Hsiao
(74) *Attorney, Agent, or Firm* — Milan Milosevic; Lisa Serdynski; Steven Courtright

(57) ABSTRACT

A valve mechanism for a gas spring suspension system that equalizes the gas between positive and negative gas chambers when the pressure in the negative gas chamber exceeds the pressure in the positive gas chamber. The suspension system includes a tube, a piston assembly slidably displaceable along the tube and a valve mechanism. The piston assembly separates the tube into the positive gas chamber and the negative gas chamber. The valve mechanism is configured to permit gas flow between the positive and negative gas chambers when the gas pressure in the negative gas chamber exceeds the gas pressure in the positive gas chamber.

20 Claims, 7 Drawing Sheets

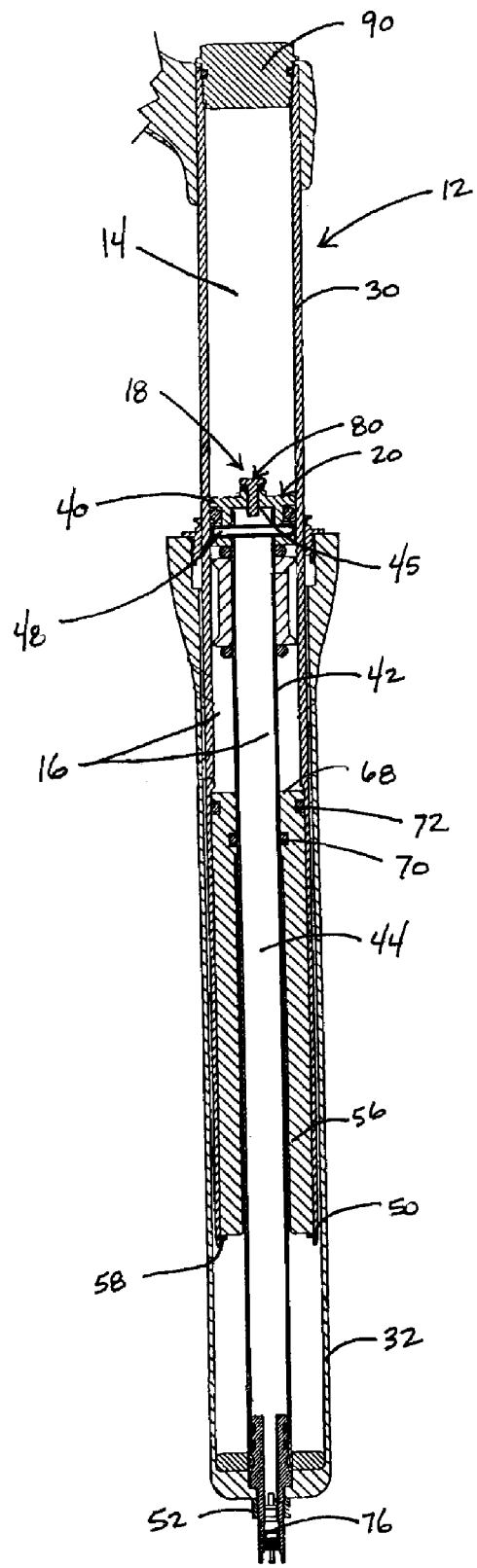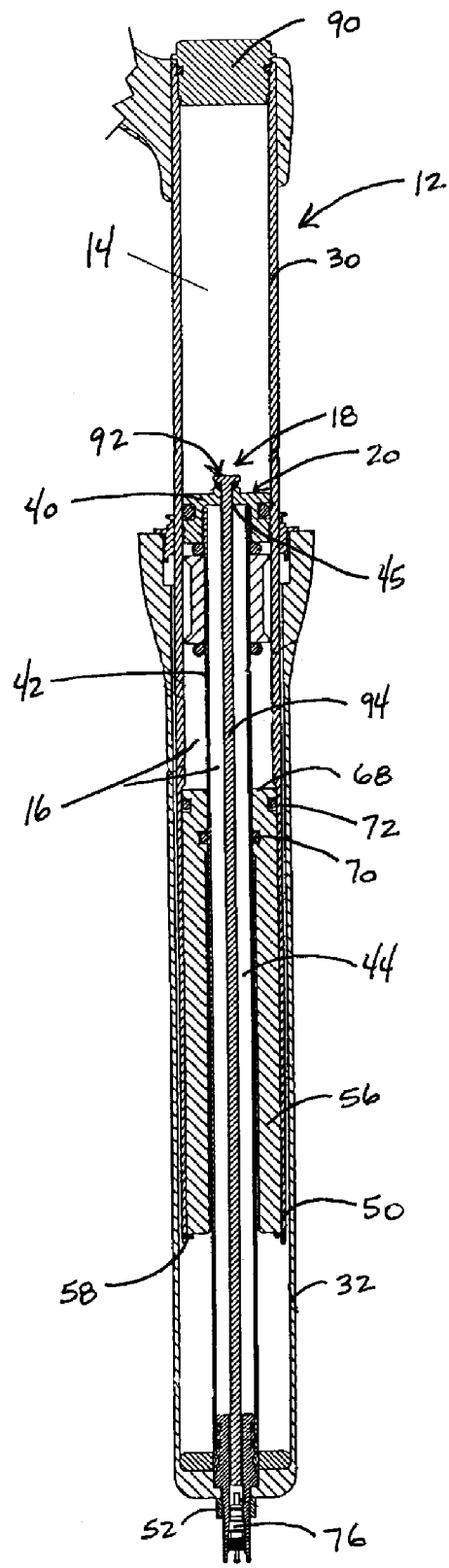

VALVE MECHANISM FOR A GAS SUSPENSION SYSTEM

RELATED APPLICATION DATA

This application is a continuation of U.S. Application Ser. No. 11/383,421, filed May 15, 2006, entitled "Valve Mechanism for a Gas Suspension System."

BACKGROUND OF INVENTION

The present invention relates to suspension systems and more particularly to a valve mechanism that permits pressure equalization between a negative gas spring chamber and a positive gas spring chamber when the pressure in the negative gas spring chamber exceeds the pressure in the positive gas spring chamber.

Typically, a suspension system includes an inner tube slidable within an outer tube and a compression or positive spring for biasing the inner and outer tubes apart from each other. The suspension system may further include a negative spring that counteracts the force of the positive spring by biasing the inner and outer tubes toward each other. The positive and negative springs permit the inner and outer tubes to compress in response to an impact and expand or rebound after the impact. The positive and negative springs may be formed from a variety of biasing elements such as coil springs, elastomer springs, leaf springs, air springs and the like. One drawback associated with gas springs is that gas may leak from the positive gas spring chamber to the negative gas spring chamber, resulting in a change in the overall spring characteristics of the suspension system. Another drawback is that the positive and negative gas spring chambers must be pressurized separately, thereby adding cost to the design by requiring an inflation valve for each of the springs. Additionally, with this configuration, the positive gas spring chamber must be pressurized before the negative gas spring chamber, further complicating the setup process. Accordingly, there is a need to provide a device that regulates the gas pressure between the positive and negative gas spring chambers and permits the use of a single inflation valve to pressurize both positive and negative gas springs.

SUMMARY OF THE INVENTION

The present invention provides a valve mechanism for a gas spring assembly for a suspension system that permits gas flow from a negative gas spring chamber to a positive gas spring chamber when the pressure in the negative gas spring exceeds the pressure in the positive gas spring chamber. The gas spring assembly includes a tube, a piston assembly that separates the tube into a positive gas chamber and a negative gas chamber and the valve mechanism. A gas passageway extends through the piston assembly to allow gas flow between the chambers.

In one embodiment, the valve mechanism is a one-way valve mechanism that regulates the gas flow between the positive and negative gas chambers. When the gas pressure in the positive gas chamber exceeds the gas pressure in the negative gas chamber the valve mechanism is configured to seal the gas passageway to prevent gas flow between the positive and negative gas chambers. When the gas pressure in the negative gas chamber exceeds the gas pressure in the positive gas chamber, the one-way valve mechanism is configured to unseal the gas passageway to permit gas flow from the negative gas chamber to the positive gas chamber thereby equalizing the pressure.

In another embodiment of the present invention, the positive gas chamber may be pressurized through a first inflation valve operatively connected to the positive gas chamber while the negative gas chamber may be pressurized with a second inflation valve operatively connected to the negative gas chamber. An advantage of the present invention is that the one-way valve mechanism allows either the positive or the negative gas chambers to be pressurized first. In another embodiment, a single inflation valve connected to the negative gas chamber may be used to pressurize both the positive and the negative gas chambers because the one-way valve mechanism permits gas to flow from the negative chamber to the positive chamber until the pressures in the two chambers equalize.

In one embodiment of the present invention, the piston assembly includes a piston slidably displaceable along the tube and a piston rod having a central bore. The one-way valve mechanism includes a valve seat extending from the piston and a valve having a valve head at one end, a barbed portion at another end and a shank portion therebetween extending through the gas passageway. The valve head and the barbed portion have a larger diameter than a diameter of the gas passageway. When the gas pressure in the negative chamber exceeds the gas pressure in the positive chamber, the valve is displaced away from the valve seat until the barbed portion abuts against the piston. The one-way valve mechanism may also include an O-ring disposed between the valve head and the piston to provide a seal between the valve head and the valve seat. When the gas pressure in the positive gas chamber exceeds the pressure in the negative gas chamber, the valve is displaced towards the valve seat, squeezing the O-ring, resulting in a gas-tight seal blocking flow from the positive gas chamber to the negative gas chamber. The one-way valve mechanism ensures that the pressure in the negative chamber does not exceed the gas pressure in the positive gas chamber.

In another embodiment of the present invention, the suspension system includes a single inflation valve assembly connected to the positive chamber and the valve mechanism is configured to allow gas flow in either direction, from the positive to the negative gas chamber or from the negative to the positive gas chamber, under various operating conditions. The valve mechanism includes a valve seat and a valve displaceable relative to the valve seat. In this embodiment, the piston functions as the valve and is slidably mounted within a tube. The valve seat includes a first end attached to the piston rod and a second end extending through the gas passageway of the piston. The valve seat also includes a perch configured to sealingly engage the valve to block gas flow between the positive and negative gas chambers.

During compression of the suspension system, the valve mechanism is in a closed position with the perch of the valve seat pressed against the valve due to the pressure in the positive chamber. As the suspension expands and reaches top-out, the piston contacts a stop element, the stop element lifting the piston or valve away from the perch of the valve seat, breaking the seal between the valve and the valve seat to permit gas flow between the positive and negative chambers. Further, when the pressure in the negative gas chamber exceeds the pressure in the positive gas chamber, the higher pressure in the negative gas chamber lifts the piston thereby permitting flow across the passageway to substantially equalize the pressures in the positive and negative gas chambers.

These and other features and advantages of the present invention will be more fully understood from the following description of certain embodiments of the invention, taken together with the accompanying drawings.

BRIEF DESCRIPTION OF DRAWINGS

In the drawings:

FIG. 6 is a cross-sectional view of a gas spring assembly in accordance with another embodiment of the present invention;

FIG. 7 is a cross-sectional view of a gas spring assembly in accordance with yet another embodiment of the present invention;

DETAILED DESCRIPTION

Figure 1:
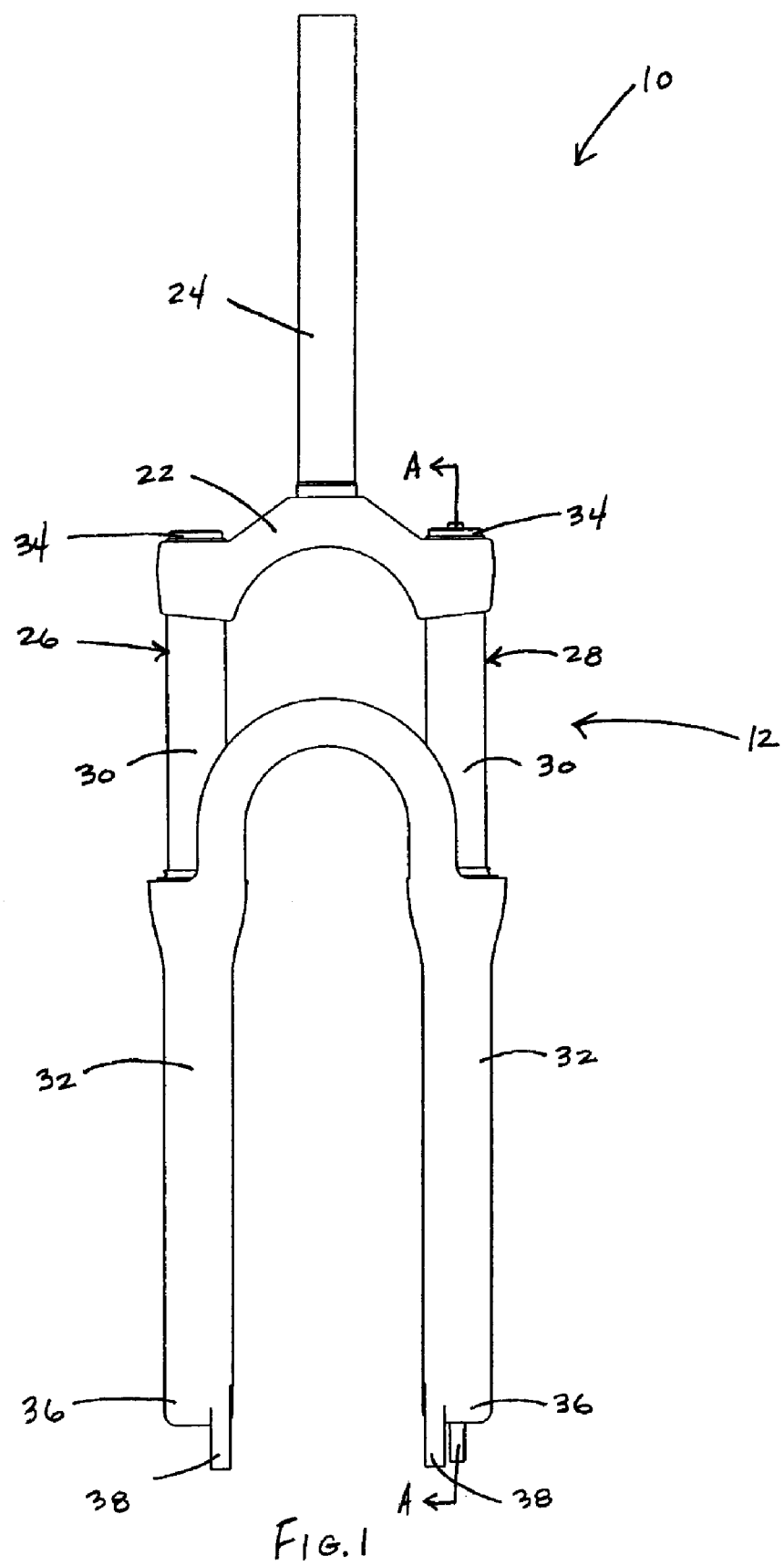
FIG. 1 is a front view of a bicycle suspension fork including a gas spring assembly in accordance with one embodiment of the present invention.

FIGS. 1-4 illustrate a bicycle front suspension fork 10 that includes a gas spring assembly 12 in accordance with one embodiment of the present invention. The gas spring assembly 12 generally includes positive and negative gas chambers 14, 16, a one-way valve mechanism 18 and a piston assembly 20. Looking to FIG. 1 the fork 10 includes a crown 22 that is connected to a steerer tube 24, a first leg 26 and a second leg 28. Each of the legs 26, 28 includes a first tube 30 slidable within a second tube 32. Alternatively, the second tube may be slidable within the first tube. The first and second tubes 30, 32 are connected at their remote ends 34 to the crown 22 and at remote ends 36 to a wheel axle (not shown) through dropouts 38. It is to be understood that although the present invention is described with respect to a front suspension fork, the gas spring assembly may be also be embodied in a rear shock, a seat post, or at other locations on a bicycle frame. Further, the gas spring assembly 12 of the present invention may be used on motorcycles as well as other handlebar-steered vehicles.

Figure 2:
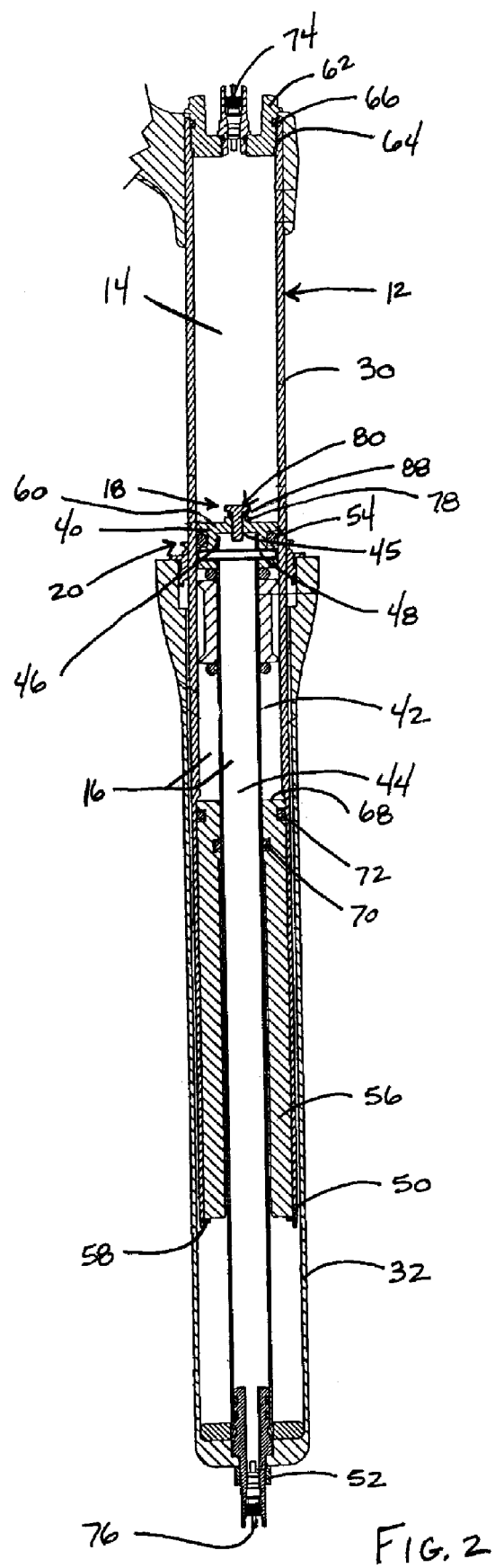
FIG. 2 is a cross-sectional view taken along line A-A of a leg of the suspension fork of FIG. 1 containing the gas spring assembly.

Looking to FIG. 2, the piston assembly 20 separates the first tube 30 into the positive gas chamber 14 and the negative gas chamber 16. The positive gas chamber 14 acts as a positive spring that biases the first and second tubes 30, 32 away from each other and the negative gas chamber 16 acts as a negative spring that counteracts the force of the positive spring by biasing the first and second tubes 30, 32 toward each other. In this embodiment, the piston assembly 20 generally includes a piston 40 and a piston rod 42 having a central bore 44. The piston 40 is slidably mounted within the first tube 30 for reciprocation therein in response to compression or rebound of the first and second tubes 30, 32 relative to each other. The piston 40 includes a gas passageway 45 for permitting gas flow between the positive and negative gas chambers 14, 16. The piston 40 is secured to an end 46 of the piston rod 42 by a roll pin 48. The piston rod 42 extends through a bottom 50 of the first tube 30 and is secured to the second tube 32 by a nut 52. The piston 40 includes an O-ring 54 that forms a gas-tight seal with the first tube 30. A bushing 56 is secured proximate the bottom 50 of the first tube 30 by a retaining ring 58 and serves as a guide for the piston rod 42.

The positive gas chamber 14 is located between the piston 40 and a top cap 62 located at an end 64 of the first tube 30. The top cap 62 includes an O-ring 66 that forms a gas-tight seal with the first tube 30. The negative gas chamber 16 may include two volumes, the volume inside the central bore 44 of the piston rod 42 and the volume outside the piston rod 42 between the roll pin 48 and an end 68 of the bushing 56. The bushing 56 includes internal and external O-rings 70, 72 that form a gas-tight seal with the piston rod 42 and the first tube 30, respectively. The two volumes of the negative gas chamber 16 are in communication since the roll pin 48 does not form a gas-tight seal with the piston 40 or the piston rod 42 therefore the two volumes function as a single volume. The positive gas chamber 14 may be pressurized with gas through an inflation valve 74 such as a Schrader valve that is threaded into the top cap 62 at the end 64 of the first tube 30, while the negative gas chamber 16 may likewise be pressurized with an inflation valve 76 such as a Schrader valve disposed in the central bore 44 at an end of the piston rod 42.

Figure 3:
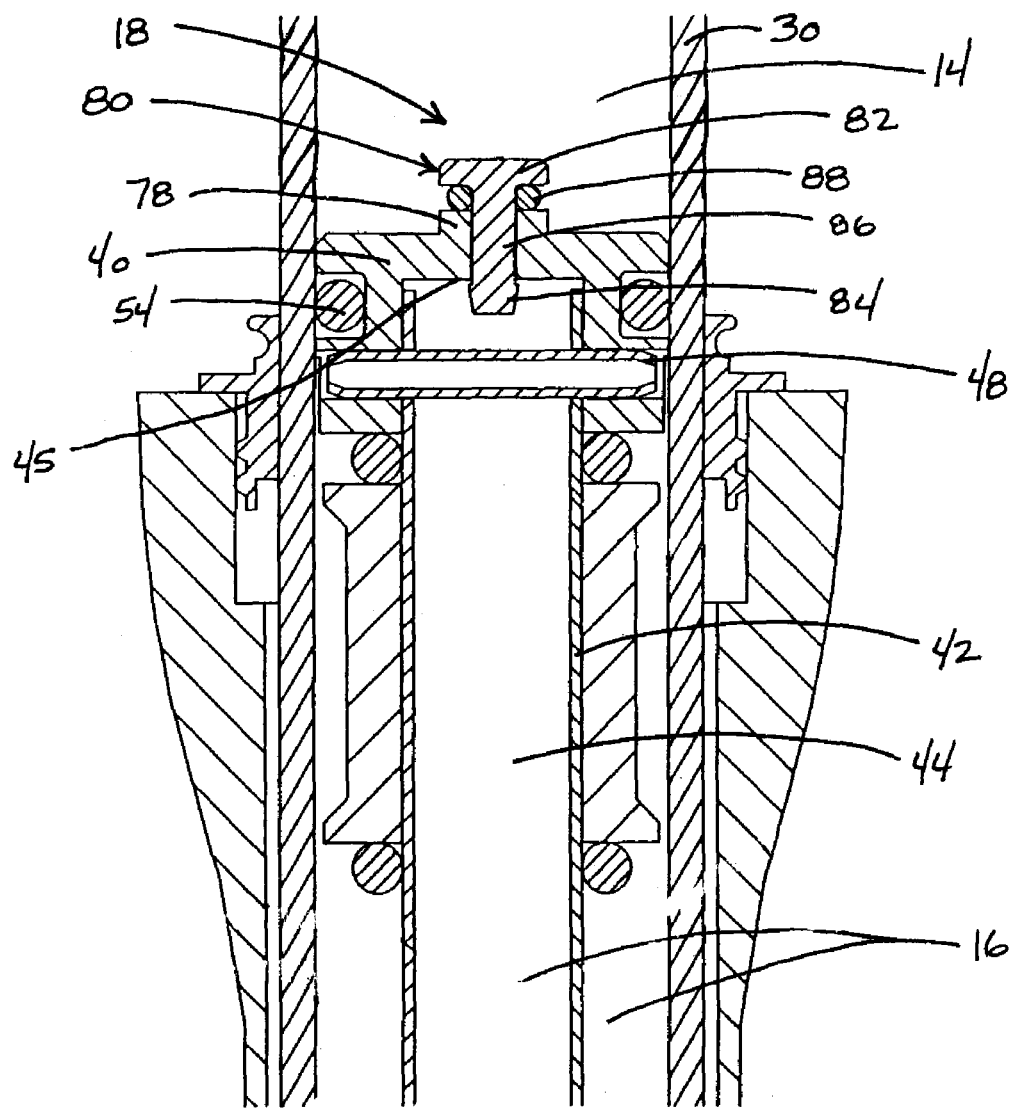
FIG. 3 is an enlarged isolated cross-sectional view of a one-way valve mechanism of the gas spring assembly of FIG. 2.
Figure 4A:
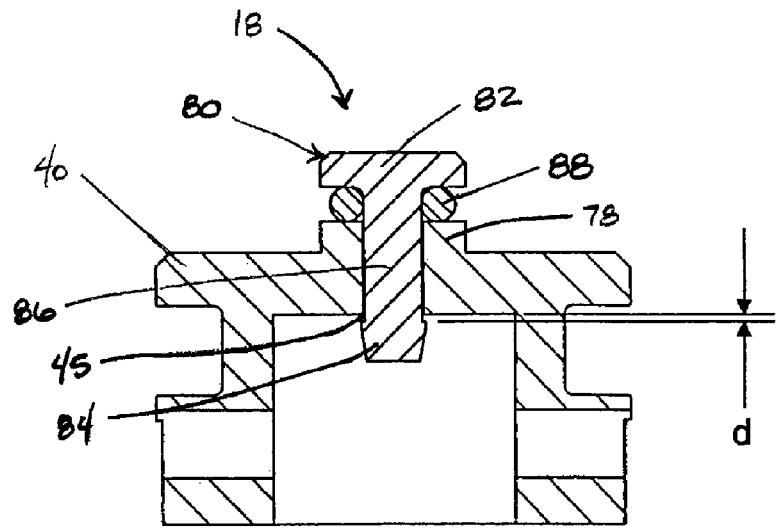
FIG. 4a is a cross-sectional view of the one-way valve mechanism of FIG. 2, showing in particular, a valve displaced toward a valve seat.
Figure 4B:
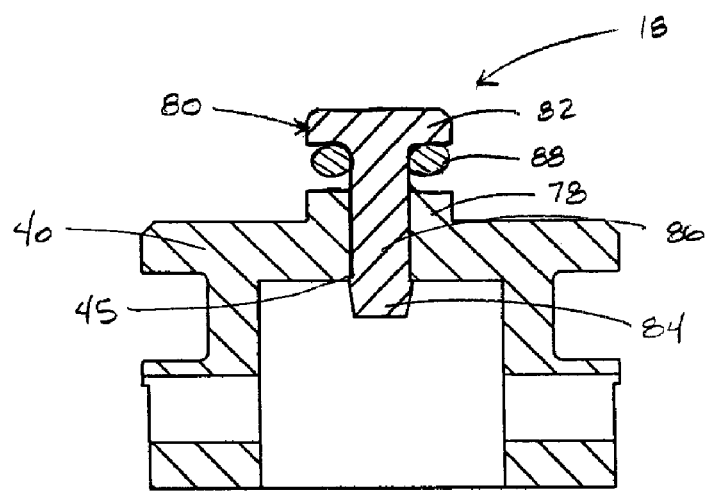
FIG. 4b is a cross-sectional view of the one-way valve mechanism of FIG. 2, showing in particular, the valve displaced away from the valve seat.

Looking to FIGS. 3, 4a and 4b, the valve mechanism 18 generally includes a valve seat 78 extending from the piston 40, and a valve 80 displaceable relative to the valve seat 78. The valve 80 includes a valve head 82 at one end, a barbed portion 84 at another end, and a shank portion 86 extending between the valve head 82 and the barbed portion 84. The barbed portion 84 has a larger diameter than the gas passageway 45 in the piston 40. During assembly, the barbed portion 84 of the valve 80 is first inserted into the gas passageway 45, forcing the gas passageway 45 to expand while the barbed portion 84 is passing through it. Once the barbed portion 84 has been inserted through the gas passageway 45, the passageway 45 returns to its original diameter. To allow the valve 80 to move within the gas passageway 45, the shank portion 86 has a smaller diameter than the gas passageway 45. The valve 80 is allowed to axially displace a distance d, a gap formed between the barbed portion 84 and the bottom surface of the piston 40 (see FIG. 4a). The valve head 82 has a larger diameter than the passageway 45, preventing the valve 80 from being pulled through the gas passageway 45. An O-ring 88 may be disposed between the piston 40 and the valve head 82 to provide a seal between the valve head 82 and the valve seat 78.

Figure 5:
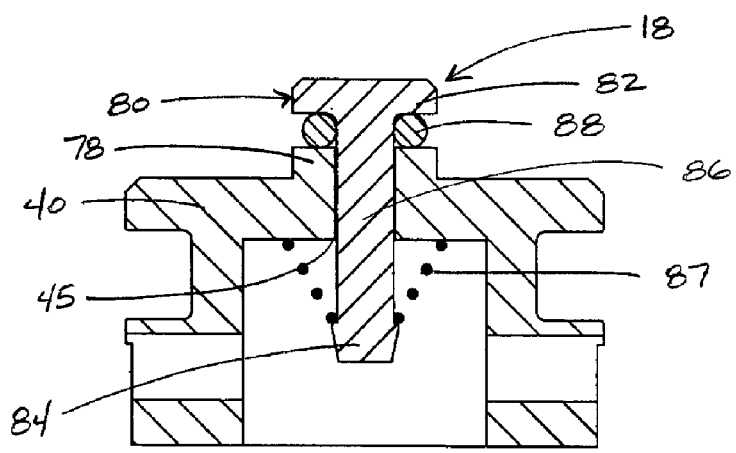
FIG. 5 is a cross-sectional view of the one-way valve mechanism of FIG. 2 further including a spring biasing the valve toward the valve seat.

Looking to FIG. 4a, when the gas pressure in the positive gas chamber 14 exceeds the gas pressure in the negative gas chamber 16, the valve 80 is displaced toward the valve seat 78, squeezing the O-ring 88, resulting in a gas-tight seal that prevents gas flow between the positive and negative gas chambers 14, 16. Looking to FIG. 4b, when the gas pressure in the negative gas chamber 16 exceeds the gas pressure in the positive gas chamber 14, the valve 80 is displaced away from the valve seat 78 until the barbed portion 84 of the valve 80 engages the piston 40. Accordingly, a gas-tight seal is broken allowing gas to flow from the negative gas chamber 16 into the positive gas chamber 14 until the gas pressures in the positive and negative gas chambers 14, 16 are substantially equal. Looking to FIG. 5, the one-way valve mechanism 18 may further include a spring 87 biasing the valve 80 against the valve seat 78. With this configuration, the valve 80 does not displace away from the valve seat 78 until the pressure in the negative gas chamber 16 exceeds the preload of the spring 87.

In this configuration, either the positive or the negative gas chamber may be pressurized first. If the negative gas chamber 16 is pressurized first, causing the pressure in the negative gas chamber 16 to exceed the pressure in the positive gas chamber 14, the valve 80 is opened or displaced away from the valve seat 78, allowing gas to flow between the two chambers 14, 16. Accordingly, this configuration prevents the too much air being introduced into the negative gas chamber 16.

During operation of the suspension system, the gas pressure in the positive gas chamber 14 is equal or greater than the gas pressure in the negative gas chamber 16, causing the valve 80 to close or displace towards the valve seat 78, to block gas flow between the two chambers 14, 16. When the fork 10 is compressed, the gas pressure in the positive gas chamber 14 increases as the volume of the positive gas chamber 14 decreases, and the pressure in the negative gas chamber 16 decreases as the volume of the negative gas chamber 16 increases. Accordingly, the valve 80 remains closed since the gas pressure in the positive gas chamber 14 exceeds the gas pressure in the negative gas chamber 16. During the return stroke, the gas pressure in the positive gas chamber 14 remains greater than the gas pressure in the negative gas chamber 16. Therefore, during normal operation of the fork 10, gas is prevented from flowing between the positive and negative gas chambers 14, 16.

When the piston 40 forms an imperfect seal between the positive and negative gas chambers 14, 16, gas may leak past O-ring 54, flowing from the positive gas chamber 14 to the negative gas chamber 16. This results in an increase in pressure in the negative gas chamber 16 and a decrease in pressure in the positive gas chamber 14. When the pressure in the negative gas chamber 16 exceeds the pressure in the positive gas chamber 14, the valve 80 opens allowing gas to flow from the negative gas chamber 16 to the positive gas chamber 14, until the pressures in the two chambers 14, 16 substantially equalize.

Looking to FIG. 6, another embodiment of the present invention is shown, similar to the embodiment of FIGS. 1-4, except that the Schrader valve 74 at the positive gas chamber 14 has been eliminated and replaced with a top cap 90 that seals the end of the first tube 30. Both the positive and negative gas chambers 14, 16 may be inflated with the Schrader valve 76 operatively connected to the negative gas chamber 16. This is possible because as gas is introduced into the negative gas chamber 16 through the Schrader valve 76, the gas pressure in the negative gas chamber 16 begins to increase above the gas pressure in the positive gas chamber 14, causing the valve 80 to open, allowing gas to flow into the positive gas chamber 14 until the pressures in the two chambers 14, 16 substantially equalize. If it is desired to have a slightly lower pressure in the negative gas chamber 16 than in the positive gas chamber 14, some of the gas from the negative gas chamber 16 may be removed through the Schrader valve 76. As the gas pressure in the negative gas chamber 16 decreases relative to the gas pressure in the positive gas chamber 14, the valve 80 closes, preventing gas from flowing between the two chambers 14, 16. Accordingly, with this configuration it is possible to reduce the gas pressure in the negative gas chamber 16 without affecting the gas pressure in the positive gas chamber 14.

Looking to FIG. 7, another embodiment of the present invention is shown, similar to the embodiment of FIGS. 1-4, except that piston rod 42 is threaded into the piston 40 and the valve 80 has been replaced with a valve 92 with an elongate shank portion 94 extending in close proximity to the Schrader valve 76, for example, within one millimeter. When the Schrader valve 76 is depressed, either manually or with a pump, it engages the shank portion 94 of the valve 92, causing the valve 92 to open. This configuration allows both chambers 14, 16 to be in communication with each other, thereby when gas is released from the negative gas chamber 16 through the Schrader valve 76, gas will also be released from the positive gas chamber 14.

Figure 8:
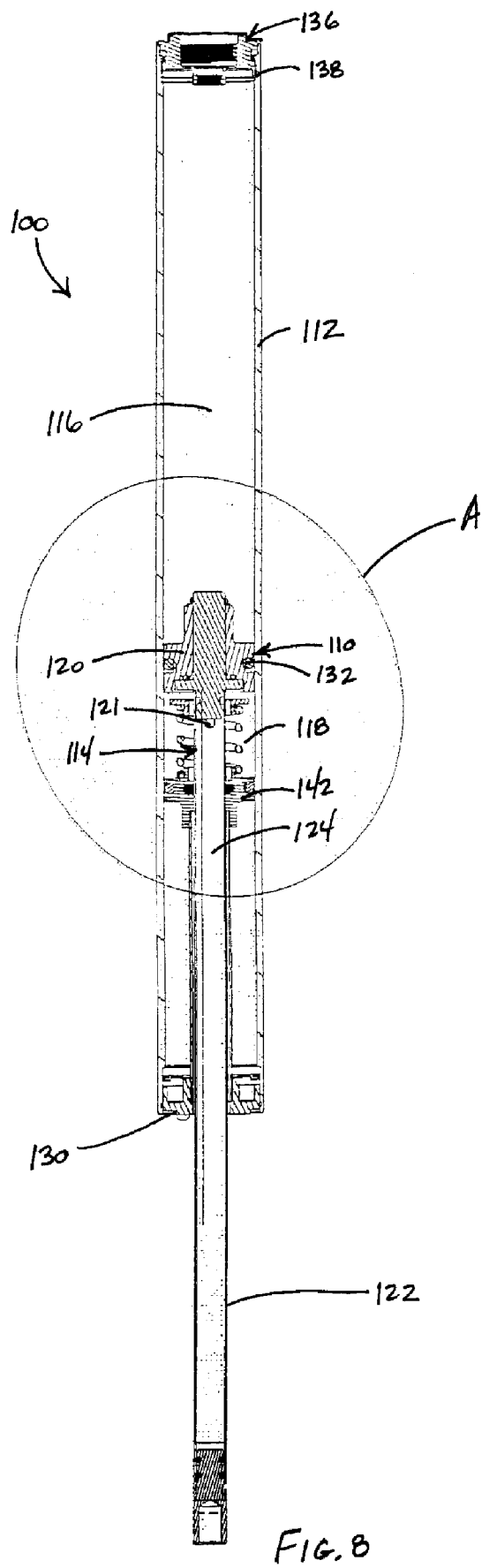
FIG. 8 is a cross-sectional view of a gas spring in accordance with yet another embodiment of the present invention.
Figure 9:
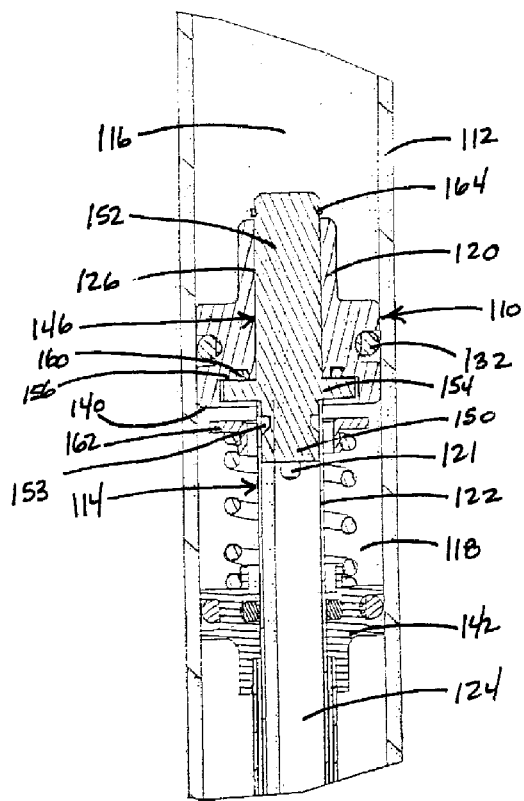
FIG. 9 is an enlarged cross-sectional view of detail A of FIG. 8, showing in particular, a valve mechanism in a closed position.
Figure 10:
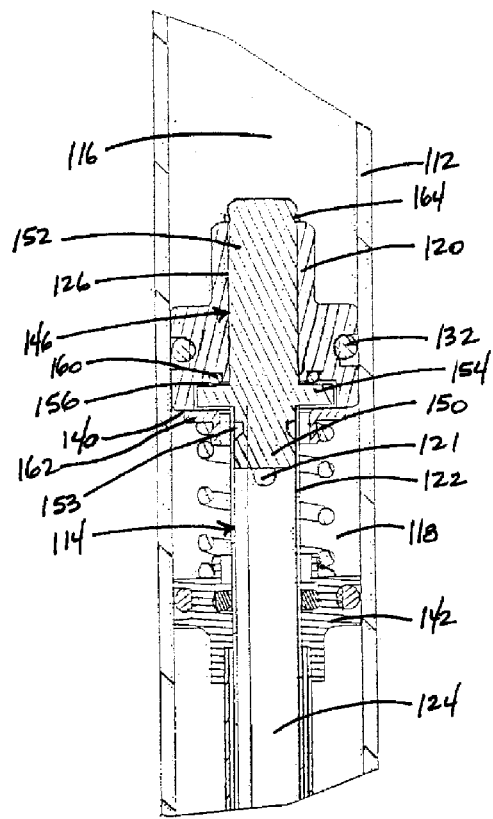
FIG. 10 is an enlarged cross-sectional view of detail A of FIG. 8, showing in particular, the valve mechanism in an open position.

FIGS. 8-10 illustrate a gas spring assembly 100 for a bicycle suspension fork in accordance with another embodiment of the present invention. The gas spring assembly 100 includes a valve mechanism 110, a tube 112, and a piston assembly 114 that separates the tube 112 into a positive gas chamber 116 and a negative gas chamber 118. The piston assembly 114 generally includes a piston 120 and a piston rod 122 having a central bore 124. The piston 120 is slidably mounted within the tube 112 for reciprocation therein in response to compression or rebound of the gas spring assembly 100. The piston 120 includes a gas passageway 126 for permitting gas flow between the positive and negative gas chambers 116, 118. The piston rod 122 extends through a bottom 130 of the tube 112 and may be secured to a second tube (not shown). The piston 120 includes an O-ring 132 that forms a gas-tight seal with the tube 112.

The positive gas chamber 116 is located between the piston 120 and an inflation valve assembly 136 located at an end 138 of the tube 112. The negative gas chamber 118 may include two volumes, the volume inside the central bore 124 of the piston rod 122 and the volume outside the piston rod 122 between a bottom surface 140 of the piston 120 and a floating piston 142. The two volumes of the negative gas chamber 118 are in communication though the hole 121 in the rod 122 and thereby function as a single volume. The positive and negative gas chambers 116, 118 are pressurized with gas through the inflation valve assembly 136.

Looking to FIGS. 9 and 10, the valve mechanism 110 generally includes a valve seat 146 and a valve, in this embodiment, the piston 120, which is displaceable between the valve seat 146 and a retaining ring 164. The valve or piston 120 is slidably mounted within the tube 112. Although, in this embodiment, the valve and the piston form one piece, the valve may be formed separately from the piston. A first end 150 of the valve seat 146 extends into the central bore 124 of the piston rod 122 and is attached thereto, and a second end 152 of the valve seat extends through the gas passageway 126 of the piston 120. In the embodiment shown, one end of the rod 122 may be crimped into recess 153 of the valve seat 146. The valve seat 146 includes a perch 154 having a surface 156 sealingly engageable with the piston 120. The valve mechanism 110 further includes a seal 160 disposed between the valve seat 146 and the piston 120.

Looking to FIG. 9, during compression of the suspension fork, the valve mechanism 110 is in a closed position. The piston 120 is pressed against the perch 154 of the valve seat 146. As the suspension fork continues to compress, pressure builds behind the piston 120 in the positive gas chamber 116 thereby maintaining the seal between the perch 154 of the valve seat 146 and the piston 120.

Looking to FIG. 10, as the suspension fork expands and reaches top-out or a full travel position, the piston 120 contacts a stop element 162, lifting the piston 120 away from the perch 154 of the valve seat 146, thereby breaking the seal between the piston 120 and valve seat 146 to permit gas flow between the two gas chambers, substantially equalizing pressure between the gas chambers. Further, when the pressure in the negative chamber 118 exceeds the pressure in the positive chamber 116, the pressure difference lifts the piston 120, opening the gas passageway 126 to equalize the pressures in the positive and negative gas chambers 116, 118.

To pressurize the gas spring assembly 100, gas is added through the inflation valve assembly 136 connected to the positive gas chamber 116. Gas fills the positive chamber 116 until the suspension fork extends to the full travel position. Once the suspension fork reaches the full travel position or tops out, the stop element 162 engages and lifts the piston 120 away from the perch 154 of the valve seat 146, causing gas to flow into the negative gas chamber 118 through the gas passageway 126. This embodiment allows a single inflation assembly to be used to pressurize both the positive and negative gas chambers.

While this invention has been described by reference to several embodiments, it should be understood that numerous changes could be made within the spirit and scope of the inventive concepts described. For example, the bicycle suspension has been depicted as a front suspension fork but it can take the form of a rear shock, a seat post, or any other type of suspension positioned along the bicycle frame. Accordingly, it is intended that the invention not be limited to the disclosed embodiments, but that it have the full scope permitted by the language of the following claims.

What is claimed:

1. A gas spring assembly for a suspension system comprising:
   a first tube;
   a second tube reciprocally slidable relative to the first tube;
   a piston assembly slidably displaceable along the first tube, the piston assembly separating the first tube into a positive spring gas chamber and a negative spring gas chamber, the positive spring gas chamber biasing the first and second tubes away from each other, the negative spring gas chamber biasing the first and second tubes toward each other; and
   a valve mechanism configured to permit gas flow between the positive and negative spring gas chambers when the gas pressure in the negative spring gas chamber exceeds the gas pressure in the positive spring gas chamber, the gas spring assembly configured to prevent gas flow between the positive and negative spring gas chambers during compression of the suspension system.

2. The gas spring assembly of claim 1 wherein the valve mechanism is a one-way valve mechanism permitting gas flow from the negative spring gas chamber to the positive spring gas chamber.

3. The gas spring assembly of claim 2 wherein the gas spring assembly further comprises an inflation valve assembly operatively connected to the negative spring gas chamber to pressurize the positive spring gas chamber and the negative spring gas chamber.

4. The gas spring assembly of claim 3 wherein the valve mechanism comprises a valve seat formed on the piston assembly and a valve displaceable toward the valve seat to prevent gas flow between the positive and negative spring gas chambers when the pressure in the positive spring gas chamber exceeds the pressure in the negative spring gas chamber, the valve displaceable away from the valve seat to permit gas flow between the positive and negative spring gas chambers when the pressure in the negative spring gas chamber exceeds the pressure in the positive spring gas chamber, the valve having a valve head and a shank portion extending in close proximity to the inflation valve such that when the inflation valve is depressed, the inflation valve engages the shank portion, displacing the valve away from the valve seat to permit gas flow between the chambers.

5. The gas spring assembly of claim 1 wherein the piston assembly comprises a piston slidably displaceable along the first tube and a piston rod operatively connected to the piston, the piston having a gas passageway to allow a gas flow between the positive and negative spring gas chambers.

6. The gas spring assembly of claim 5 wherein the piston rod is connected to the piston by a roll pin.

7. The gas spring assembly of claim 5 wherein the piston rod has a central bore for receiving an inflation valve assembly.

8. The gas spring assembly of claim 5 wherein the valve mechanism comprises a valve seat formed on the piston, and a valve displaceable toward the valve seat to prevent gas flow between the spring gas chambers when the pressure in the positive spring gas chamber exceeds the gas pressure in the negative spring gas chamber, the valve displaceable away from the valve seat to permit gas flow from the negative spring gas chamber to the positive spring gas chamber when the pressure in the negative spring gas chamber exceeds the pressure in the positive spring gas chamber.

9. The gas spring assembly of claim 8 wherein the valve comprises a valve head, a barbed portion and a shank portion extending between the valve head and the barbed portion, the shank portion extending through the gas passageway, the valve head and the barbed portion have a larger diameter than a diameter of the gas passageway.

10. The gas spring assembly of claim 9 wherein the valve mechanism further includes a seal disposed between the valve head and the valve seat to prevent gas flow between the chambers when the valve is displaced toward the valve seat.

11. The gas spring assembly of claim 10 wherein the seal is an O-ring.

12. The gas spring assembly of claim 1 further comprises an inflation valve assembly operatively connected to the positive spring gas chamber to pressurize the positive spring gas chamber and the negative spring gas chamber.

13. The gas spring assembly of claim 12 wherein the piston assembly comprises a piston slidably displaceable along the first tube and a piston rod operatively connected to the piston, the piston having a gas passageway to allow gas flow between the positive and negative spring gas chambers.

14. The gas spring assembly of claim 13 wherein the valve mechanism comprises a valve seat, and a valve forming the piston, the valve configured to displace toward the valve seat to prevent gas flow between the positive and negative spring gas chambers, the valve configured to displace away from the valve seat to permit gas flow between the positive and negative spring gas chambers when the pressure in the negative spring gas chamber exceeds the pressure in the positive spring gas chamber.

15. The gas spring assembly of claim 14 wherein the valve mechanism further comprises a stop element for lifting the valve away from the valve seat to permit gas flow between the positive and negative spring gas chambers when the suspension system reaches a predetermined travel position.

16. The gas spring assembly of claim 14, wherein the valve seat comprises a first end connected to the piston rod, a second end extending through the gas passageway of the piston and a perch sealingly engageable with the valve to prevent gas flow between the positive and negative spring gas chambers.

17. A valve mechanism for a gas spring suspension system having first and second tubes and positive and negative spring gas chambers, the positive spring gas chamber biasing the first and second tubes away from each other, the negative spring gas chamber biasing the first and second tubes toward each other, the valve mechanism comprising:
- a gas passageway extending between the positive and negative spring gas chambers;
- a valve seat; and
- a valve displaced toward the valve seat to prevent gas flow through the gas passageway when the pressure in the positive spring gas chamber exceeds the pressure in the negative spring gas chamber, the valve displaced away from the valve seat to permit gas flow through the gas passageway when the pressure in the negative spring gas chamber exceeds the pressure in the positive spring gas chamber, the gas spring suspension system configured to prevent gas flow between the positive and negative spring gas chambers during compression of the suspension system.

18. The valve mechanism of claim 17 wherein the valve comprises a barbed portion at a first end of the valve, a valve head at a second end of the valve and a shank portion extending between the barbed portion and the valve head and through the gas passageway, the barbed portion and the valve head having larger diameters than a diameter of the gas passageway to prevent the valve from being removed from the valve seat.

19. The valve mechanism of claim 18 wherein the valve mechanism further includes a seal disposed between the valve head and the valve seat to prevent gas flow between the chambers when the valve is displaced toward the valve seat.

20. The valve mechanism of claim 19 wherein the seal is an O-ring.

* * * * *